US012742954B2

(12) United States Patent
Fang et al.

(10) Patent No.: US 12,742,954 B2
(45) Date of Patent: Sep. 22, 2026

(54) SEMICONDUCTOR INSPECTION TOOL AND METHODS OF OPERATION

(71) Applicant: Taiwan Semiconductor Manufacturing Company, Ltd., Hsinchu (TW)

(72) Inventors: Cheng-Tai Fang, Tainan City (TW); Keng-Ying Liao, Tainan City (TW); Po-Zen Chen, Tainan City (TW); Wei-Cheng Chu, Tainan City (TW); Chien-Chung Chen, Kaohsiung City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 161 days.

(21) Appl. No.: 18/733,458

(22) Filed: Jun. 4, 2024

(65) Prior Publication Data

US 2025/0370238 A1 Dec. 4, 2025

(51) Int. Cl.

| | |
|---|---|
| ***G02B 21/00*** | (2006.01) |
| ***G01N 21/88*** | (2006.01) |
| ***G01N 21/95*** | (2006.01) |
| ***G02B 21/24*** | (2006.01) |
| ***G02B 21/26*** | (2006.01) |
| ***G02B 21/32*** | (2006.01) |

(52) U.S. Cl.

CPC ..... *G02B 21/0016* (2013.01); *G01N 21/8806* (2013.01); *G01N 21/9501* (2013.01); *G02B 21/247* (2013.01); *G02B 21/26* (2013.01); *G02B 21/32* (2013.01); *G02B 21/008* (2013.01)

(58) Field of Classification Search

CPC .............. G02B 21/008; G02B 21/0016; G02B 21/247; G02B 21/26; G02B 21/32; G01N 21/8806; G01N 21/9501

See application file for complete search history.

(56) References Cited

U.S. PATENT DOCUMENTS 5,483,056 A * 1/1996 Imai ...................... G03F 9/7026 250/548
6,801,650 B1 * 10/2004 Kikuchi .............. G03F 7/70691 250/548

* cited by examiner

*Primary Examiner* — Kevin K Pyo
(74) *Attorney, Agent, or Firm* — Harrity & Harrity, LLP

(57) ABSTRACT

A semiconductor inspection tool may include a distance monitoring system that is configured to monitor the distance between a microscope of the semiconductor inspection tool and a semiconductor workpiece under inspection. The distance monitoring system may include a support member and a monitoring device mounted to an end of the support member. An opposing end of the support member may be coupled to the microscope, and an actuator may be used to spin the monitoring device around the microscope using the support member. The monitoring device is configured to spin around the microscope and generate images and/or a video that can be used to monitor the distance between the microscope and the surface of the semiconductor workpiece to ensure that a minimum distance between the microscope and the semiconductor workpiece is maintained.

20 Claims, 13 Drawing Sheets

SEMICONDUCTOR INSPECTION TOOL AND METHODS OF OPERATION

BACKGROUND

Semiconductor inspection tools are used throughout the semiconductor manufacturing process for various purposes, ranging from tuning process parameters, identifying defects, performing measurements, and acceptance testing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
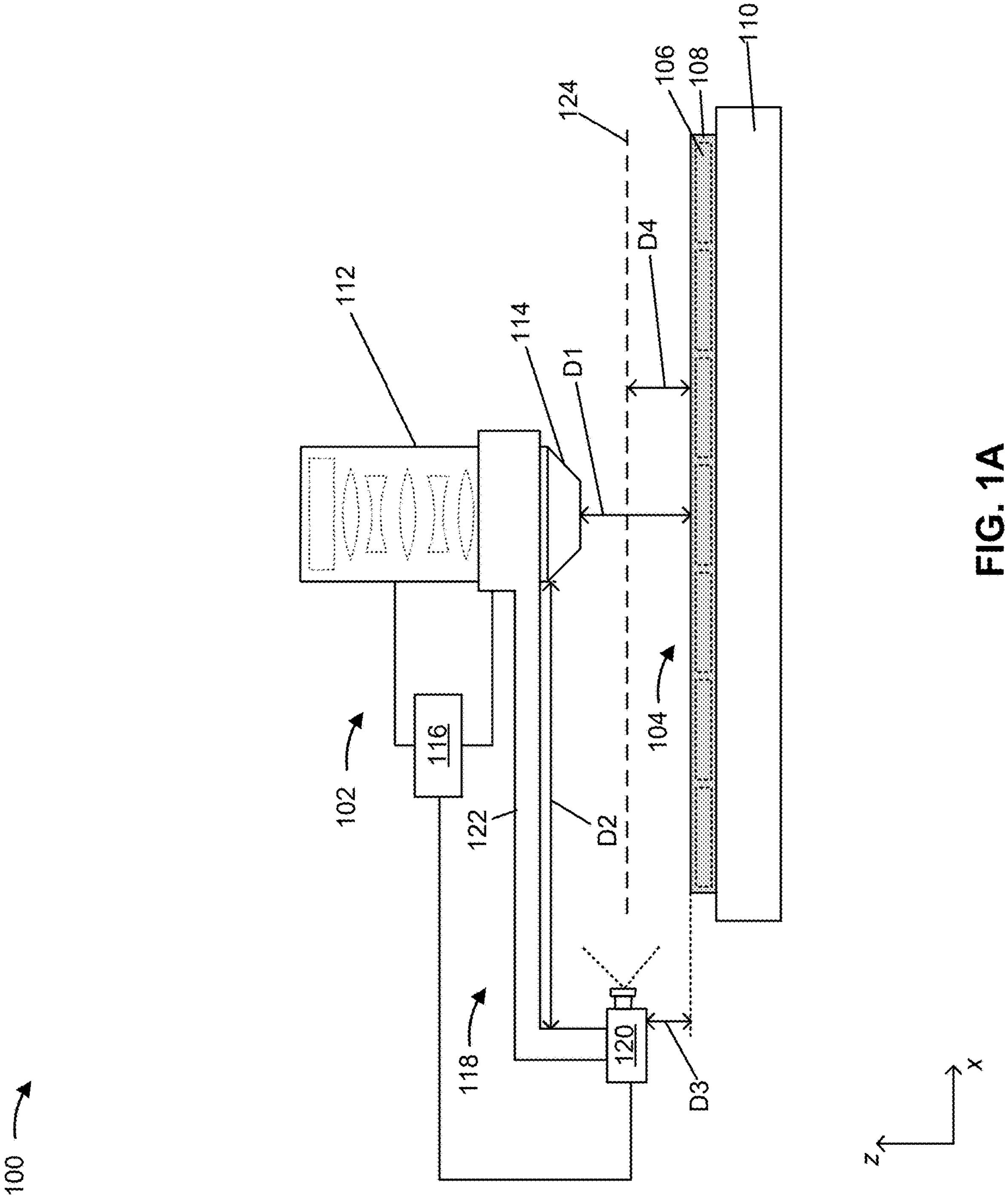
FIGS. 1A and 1B are diagrams of examples of a semiconductor inspection tool described herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some semiconductor inspection tools include a microscope that is configured to be positioned near a surface of a semiconductor workpiece (e.g., a semiconductor wafer, a semiconductor die) to perform optical inspection of the semiconductor workpiece. In some cases, a semiconductor inspection tool can be programmed with soft limits for maintaining a distance between the microscope and the surface of the semiconductor wafer to reduce the likelihood of the microscope contacting the surface and damaging the semiconductor workpiece. However, the microscope can drift out of tolerance and/or errors in positioning of the microscope can occur. This can result in the microscope breaching the soft limit set for the distance and contacting the surface of the semiconductor workpiece, causing damage to the semiconductor workpiece.

In some implementations described herein, a semiconductor inspection tool for semiconductor manufacturing may include a distance monitoring system that is configured to monitor the distance between a microscope of the semiconductor inspection tool and a semiconductor workpiece under inspection. The distance monitoring system may include a support member and a monitoring device mounted to an end of the support member. An opposing end of the support member may be coupled to the microscope, and an actuator may be used to spin the monitoring device around the microscope using the support member. As the monitoring device spins around the microscope, the monitoring device generates images and/or a video that can be used to monitor the distance between the microscope and the surface of the semiconductor workpiece to ensure that a minimum distance between the microscope and the semiconductor workpiece is maintained.

In this way, the distance monitoring system enables the distance between the microscope and the semiconductor workpiece to be monitored while the semiconductor inspection tool is in use. The distance monitoring system can be used to ensure that a safe distance is maintained between the microscope and the semiconductor workpiece, and can be used to automatically stop the operation of the semiconductor inspection tool and/or can be used to automatically move the microscope away from the semiconductor workpiece if the microscope breaches the minimum distance between the microscope and the semiconductor workpiece. This reduces the likelihood of causing damage to the semiconductor workpiece using the semiconductor inspection tool, which may reduce the likelihood of and/or amount of scrapped dies and/or semiconductor wafers caused by the semiconductor inspection tool.

The distance monitoring system described herein can be used with standalone semiconductor inspection tools (e.g., electron microscope tools, optical inspection tools) and/or can be used with semiconductor inspection tools that are integrated into semiconductor processing tools (e.g., an inspection stage of an extreme ultraviolet (EUV) lithography system), among other examples. Additionally and/or alternatively, the distance monitoring system described herein can be used with semiconductor inspection tools that are used to inspect other components of semiconductor manufacturing, such as lithography masks and/or lithography reticles, among other examples.

Figure 1B:
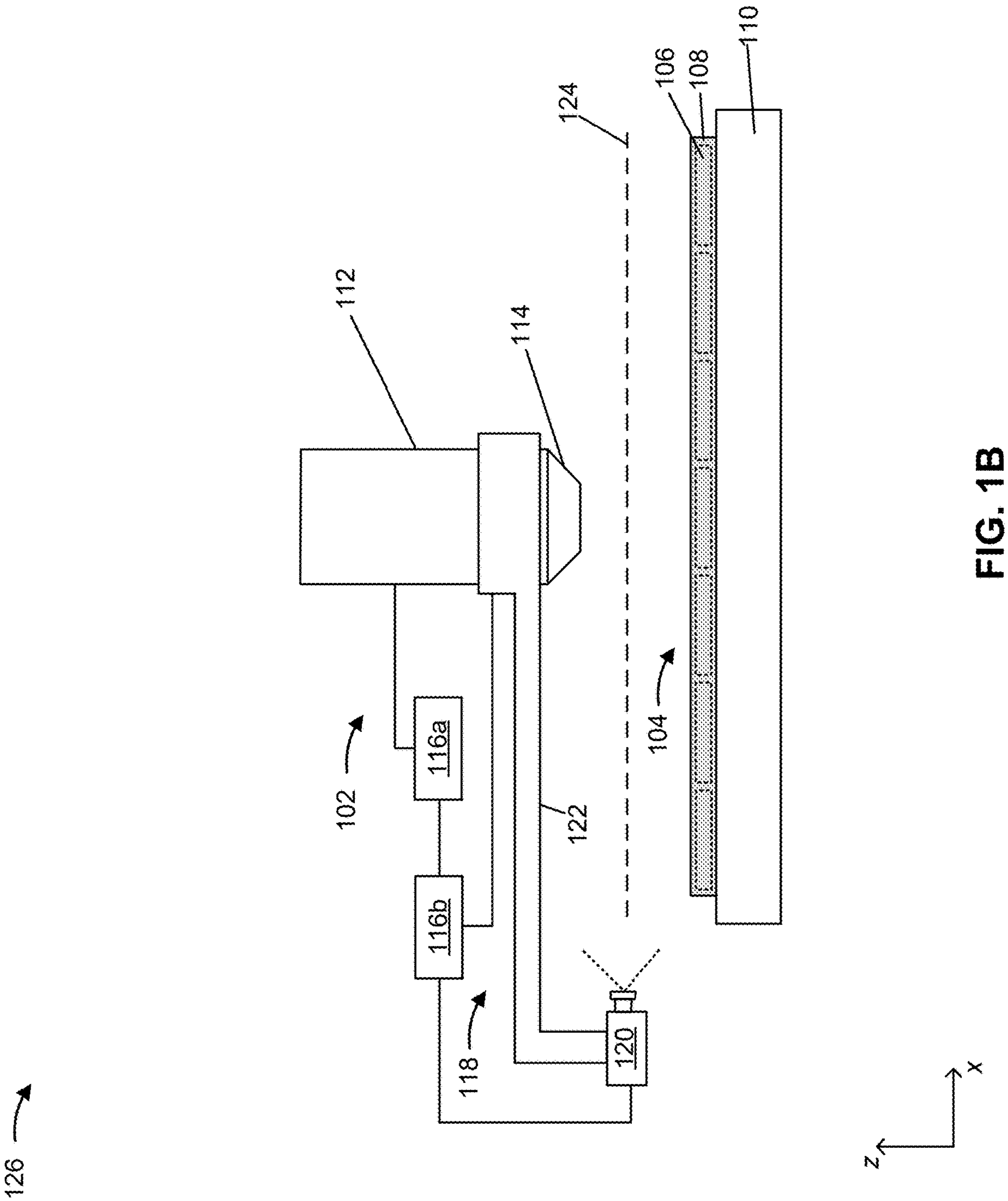

FIGS. 1A and 1B are diagrams of examples of a semiconductor inspection tool 102 described herein. As shown in an example 100 in FIG. 1A, the semiconductor inspection tool 102 may be used to inspect a semiconductor workpiece 104, which may include a semiconductor die 106, a semiconductor wafer 108 on which one or more semiconductor dies 106 are formed, a semiconductor processing component such as a lithography mask or a lithography reticle, and/or another component associated with semiconductor device manufacturing.

In some implementations, the semiconductor inspection tool 102 includes an electron microscope tool that is configured to generate microscopy images of the semiconductor workpiece 104. In some implementations, the semiconductor inspection tool 102 includes a metrology tool that is used to measure one or more dimensions of the semiconductor workpiece 104. In some implementations, the semiconductor inspection tool 102 includes a defect inspection tool that is used to inspect the semiconductor workpiece 104 for defects. In some implementations, the semiconductor inspection tool 102 includes another type of semiconductor inspection tool.

As further shown in FIG. 1A, the semiconductor inspection tool 102 includes a stage 110 that is configured to secure and/or support a semiconductor workpiece 104 under inspection. In some implementations, the stage 110 includes a platen. In some implementations, the stage 110 includes a chuck such as vacuum chuck or an electrostatic chuck (ESC). The stage 110 may be sized to support the entire semiconductor workpiece 104 or a portion thereof. For example, the stage 110 may span an entire lateral size of the semiconductor workpiece 104, and may extend laterally outward past the semiconductor workpiece 104 in an x-direction, in a y-direction, and/or in another lateral direction.

The semiconductor inspection tool 102 further includes an inspection device 112. The inspection device 112 may include a microscope and/or another type of inspection device that includes a plurality of lenses, including a bottom lens 114 at a bottom of the inspection device 112. The bottom lens 114 is positioned closest of the lenses to the stage 110. The lenses, including the bottom lens 114, of the inspection device 112 may be used to focus a field of view of the semiconductor inspection tool 102 on the semiconductor workpiece 104. The lenses of the inspection device 112, including the bottom lens 114, may include one or more types of lenses, such as convex lenses, concave lenses, plano-convex lenses, plano-concave lenses, positive meniscus lenses, negative meniscus lenses, converging meniscus lenses, and/or other types of lenses.

The inspection device 112 may further include an image sensor device that is configured to generate images and/or video of the field of view on the semiconductor workpiece 104. The image sensor device may include a charge coupled device (CCD) image sensor, a complementary metal oxide semiconductor (CMOS) image sensor, a camera device (e.g., a device that includes a combination of an image sensor device and an image processor), and/or one or more other types of devices that are capable of generating image and/or video.

The semiconductor inspection tool 102 further includes a controller 116 (e.g., a processor, a combination of a processor and a memory, a system on chip (SoC), a programmable logic controller (PLC), an application-specific integrated circuit (ASIC), a field-programmable gate array (FPGA), a microcontroller, and/or another type of controller). The controller 116 is communicatively coupled with the inspection device 112 and is configured to control the operation of the inspection device 112 by receiving signals from, and transmitting signals to, the inspection device 112. The one or more signals may include a voltage, a current, a digital communication, and/or another type of signal.

In some implementations, the controller 116 transmits one or more signals to the inspection device 112 to cause the inspection device 112 to generate an image or a video of a field of view on the semiconductor workpiece 104. The inspection device 112 may generate the image and/or the video, and may transmit data representing the image and/or the video to the controller 116 for processing. The controller 116 may analyze the image and/or the video to perform one or more measurements of the semiconductor workpiece 104, to determine whether one or more dimensions of the semiconductor workpiece 104 satisfy one or more thresholds (e.g., acceptance testing tolerances), and/or to detect defects in the semiconductor workpiece 104, among other examples.

In some implementations, the controller 116 transmits one or more signals to the inspection device 112 to cause the inspection device 112 to be actuated. The one or more signals may cause an actuator (e.g., a drive system, a motor system, a magnet system, a pneumatic system) of the inspection device 112 to move the inspection device 112 laterally (e.g., in an x-direction and/or in a y-direction) to enable various regions of the semiconductor workpiece 104 (e.g., to enable multiple semiconductor dies 106 of the semiconductor wafer 108) to be inspected. Additionally and/or alternatively, the one or more signals may cause the actuator of the inspection device 112 to move the inspection device 112 vertically (e.g., in a z-direction) to enable the field of view of the inspection device 112 to be focused and/or to adjust a depth of focus of the inspection device 112.

The controller 116 communicates with the inspection device 112 over wired and/or wireless connections. While the controller 116 is illustrated as being located remotely from the inspection device 112, the controller 116 may be co-located with the inspection device 112 (e.g., in the same housing, in the same device, on the same SoC or integrated circuit, on the same die, among other examples).

As further shown in FIG. 1A, a monitoring system 118 may be associated with the semiconductor inspection tool 102. In particular, the monitoring system 118 may be coupled to and/or mounted to the inspection device 112 of the semiconductor inspection tool 102. The monitoring system 118 is configured to monitor a distance D1 between the bottom lens 114 of the semiconductor inspection tool 102 and the top surface of the semiconductor workpiece 104 to ensure a minimum vertical distance (e.g., z-direction distance) is maintained between the bottom lens 114 of the semiconductor inspection tool 102 and the top surface of the semiconductor workpiece 104. The prevents, minimizes, and/or reduces the likelihood of the bottom lens 114 of the semiconductor inspection tool 102 contacting and damaging the semiconductor workpiece 104.

The monitoring system 118 includes a monitoring device 120 that is configured to generate images and/or video (e.g., live/streaming video, recorded video) of the bottom lens 114 and the top surface of the semiconductor workpiece 104 for monitoring the distance D1 between the bottom lens 114 of the semiconductor inspection tool 102 and the top surface of the semiconductor workpiece 104. The monitoring device 120 may include an image sensor device that is configured to generate images and/or video. The image sensor device may include a CCD image sensor, a CMOS image sensor, and/or another type of image sensor. In some implementations, the monitoring device 120 includes a camera device that includes a combination of an image sensor device and an image processor.

The monitoring device 120 may be coupled to a support member 122 that extends laterally from the inspection device 112 of the semiconductor inspection tool 102. The monitoring device 120 may be attached to, mounted to, and/or supported by a first end of the support member 122. The support member 122 may be attached to, mounted to, and/or supported by the inspection device 112 at a second end of the support member 122 opposing the first end. This enables the monitoring device 120 to be spaced apart from the bottom lens 114 by a distance D2 to avoid the monitoring device 120 interfering or obstructing the field of view of the inspection device 112. In some implementations, the support member 122 also includes a vertical section at the first end that enables monitoring device 120 to be positioned below the support member 122 such that the support member 122 does not interfere with or obstruct the field of view of the monitoring device 120.

The support member 122 may be formed of various materials, including metals (e.g., steel, aluminum, titanium, an alloy, and/or a combination thereof), plastics, resins, composite materials, carbon fibers, and/or other types of materials. The support member 122 may include elongated member (e.g., a support arm, a support beam, a support pole) coupled to a ring that can be fitted around the inspection device 112. The support member 122 may be extruded, forged, rolled, casted, and/or formed by other manufacturing techniques. The support member 122 may include additional components, such as fasteners (e.g., screws, rivets), brackets, plates, gusset plates, and/or other structural components that enable the monitoring device 120 to be removably attached to the support member 122 and/or enable the support member 122 to be removably attached to the inspection device 112.

In some implementations, the support member 122 is movable relative to the inspection device 112. For example, the support member 122 may be laterally or horizontally rotated relative to the inspection device 112 to enable the monitoring device 120 to be rotated around the bottom lens 114. The monitoring system 118 may include a drive system that is used to rotate the support member 122 relative to the inspection device 112. The drive system may include a belt drive system, a gear drive system, a motor system (e.g., a servo motors, a stepper motor, a brushless motors), a magnetic drive system, a pneumatic drive system, and/or another type of drive system that is capable of rotating the support member 122. This enables the monitoring device 120 to generate images and/or video from multiple perspectives around the bottom lens 114. In some implementations, this enables the monitoring system 118 to monitor the distance D1 in a 360 degree monitoring range around the bottom lens 114. Alternatively, the support member 122 is secured to the inspection device 112 in a fixed manner, and the inspection device 112 may rotate to facilitate monitoring of the distance D1 around the bottom lens 114 by the monitoring device 120.

As another example, the support member 122 may be vertically movable in the z-direction relative to the inspection device 112 to enable the vertical position (e.g., the z-direction position) of the monitoring device 120 to be adjusted. The vertical movement of the support member 122 may have a bottom position (e.g., a lowest z-direction position) such that a minimum distance D3 is maintained between the monitoring device 120 and the top surface of the semiconductor workpiece 104. This ensures that the monitoring device 120 does not contact the top surface of the semiconductor workpiece 104 when the inspection device 112 is positioned over an off-center location of the semiconductor workpiece 104 (in which case, the monitoring device 120 may be over the top surface of the semiconductor workpiece 104 as opposed to being outside a perimeter of the semiconductor workpiece 104 when the inspection device is centered over the semiconductor workpiece 104). Alternatively, the support member 122 is secured to the inspection device 112 in a fixed manner, and the support member 122 is attached to a vertical location on the inspection device 112 that enables the minimum distance D3 to be maintained when the inspection device 112 is in the lowest vertical position for the inspection device 112.

The monitoring device 120 may be communicatively coupled with the controller 116 and may provide generated images and/or generated video to the controller 116. The controller 116 may provide one or more signals to the support member 122 to cause the support member 122 to rotate the monitoring device 120 around the bottom lens 114, and/or may provide one or more signals to the monitoring device 120 to generate the images and/or video.

The controller 116 may receive the generated images and/or the generated video, and may monitor the distance D1 between the bottom lens 114 of the semiconductor inspection tool 102 and the top surface of the semiconductor workpiece 104. The controller 116 may monitor the distance D1 by determining an estimated distance for the distance D1 based on the generated images and/or the generated video. For example, the controller 116 may use image recognition techniques to identify the bottom lens 114 and the surface of the semiconductor workpiece 104 in the generated images and/or in the generated video, and may determine a quantity of pixels between the bottom lens 114 and the top surface of the semiconductor workpiece 104 in the generated images and/or in the generated video. The controller 116 may determine the estimated distance for the distance D1 based on the quantity of pixels. Each pixel in the generated images and/or in the generated video may correspond to a particular unit of distance (e.g., 5 microns per pixel, 1 millimeter per pixel) that is based on the size of the pixels in the generated images and/or in the generated video, based on the distance between the monitoring device 120 and the bottom lens 114, and/or based on another parameter.

The controller 116 may be further configured to control the operation of the inspection device 112 based on monitoring the distance D1 between the bottom lens 114 of the semiconductor inspection tool 102 and the top surface of the semiconductor workpiece 104 to ensure that a minimum distance D4 is maintained between the bottom lens 114 and the top surface of the semiconductor workpiece 104. The minimum distance D4 may correspond to a distance threshold 124 that is configured for the inspection device 112 of the semiconductor inspection tool 102. The distance threshold 124 may be selected to prevent, minimize, and/or reduce the likelihood of the bottom lens 114 contacting the top surface of the semiconductor workpiece 104 during inspection of the semiconductor workpiece 104 using the semiconductor inspection tool 102.

The controller 116 may determine, based on the estimated distance for the distance D1 determined by the controller 116 based on the images and/or video generated by and received from the monitoring device 120, whether the estimated distance satisfies the distance threshold 124. For example, the controller 116 may determine whether the estimated distance is greater than or approximately equal to the distance threshold 124. As another example, the controller 116 may determine whether the estimated distance is less than or approximately equal to the distance threshold 124.

In some implementations, if the controller 116 determines that the estimated distance for the distance D1 is less than or approximately equal to the distance threshold 124, the controller 116 may provide one or more signals to the inspection device 112 to cause the inspection device 112 to stop the z-direction movement of the inspection device 112 so that the inspection device 112 does not move closer to the surface of the semiconductor workpieces 104.

In some implementations, if the controller 116 determines that the estimated distance for the distance D1 is less than or approximately equal to the distance threshold 124, the controller 116 may provide one or more signals to the inspection device 112 to cause the inspection device 112 to move away from the surface of the semiconductor workpieces 104 in the z-direction so that the distance D1 between the bottom lens 114 and the surface of the semiconductor workpieces 104 is increased.

In some implementations, the controller 116 determines the distance threshold 124 may be selected based on positioning tolerance for inspection device 112, based on amount vibration that is the inspection device 112 is estimated to experience during operation of the semiconductor inspection tool 102, based on movement granularity of for the inspection device 112, and/or based on another attribute, property, and/or parameter associated with the semiconductor inspection tool 102. In some implementations, the controller 116 uses a machine learning model to analyze a large data set of historical inspection operations performed using the semiconductor inspection tool 102 to determine the distance threshold 124. In some implementations, the controller 116 uses the machine learning model to determine a likelihood that a candidate distance threshold will result in the inspection device 112 contacting the surface of a semiconductor workpiece 104. The controller 116 may train, update, and/or refine the machine learning model to increase the accuracy of the outcomes and/or parameters determined using the machine learning model. The controller 116 may train, update, and/or refine the machine learning model based on feedback and/or results from subsequent inspection operations the associated distance thresholds 124 selected for the subsequent inspection operations performed using the semiconductor inspection tool 102.

In some implementations, the controller 116 determines the distance threshold 124 prior to an inspection operation performed using the semiconductor inspection tool 102. In some implementations, the controller 116 determines or adjusts the distance threshold 124 during an inspection operation that is performed using the semiconductor inspection tool 102. For example, sensors included in the semiconductor inspection tool 102 may provide vibration data and/or other types of data to the controller 116, and the controller 116 may determine to increase or decrease the distance threshold 124 based on the sensor data received from the sensors. As an example, the controller 116 may detect an increase in the amount of vibration experienced by the inspection device 112 based on the sensor data, and may increase the distance threshold 124 based on detecting the increase the amount of vibration to ensure that the vibration does not cause the bottom lens 114 to breach the minimum distance D4.

In some implementations, the controller 116 provides one or more signals to the inspection device 112, to the monitoring device 120, and/or to the support member 122 based on determining that the bottom lens 114 is approaching the distance threshold 124. For example, the controller 116 may provide one or more signals to the inspection device 112 to reduce the movement speed (e.g., the z-direction movement speed, the lateral movement speed) or to increase the movement granularity of the inspection device 112 based on determining that the bottom lens 114 is approaching the distance threshold 124. As another example, the controller 116 may provide one or more signals to the support member 122 to reduce the movement speed or to increase the movement granularity of moving the monitoring device 120 around the bottom lens 114 based on determining that the bottom lens 114 is approaching the distance threshold 124. As another example, the controller 116 may provide one or more signals to the monitoring device 120 to cause the monitoring device 120 to generate images and/or video at a greater rate based on determining that the bottom lens 114 is approaching the distance threshold 124.

In some implementations, the controller 116 determines that the bottom lens 114 is approaching the distance threshold 124 by using the estimated distance for the distance D1, that was determined by the controller 116 based on the images and/or video generated by and received from the monitoring device 120, to determine whether the z-direction position of the bottom lens 114 is within 5% of the distance threshold 124, within 10% of the distance threshold 124, and/or within another percentage of the distance threshold 124.

FIG. 1B illustrates another example 126 of the semiconductor inspection tool 102 and the monitoring system 118 in which the semiconductor inspection tool 102 and the monitoring system 118 include separate controllers that intercommunicate. For example, the semiconductor inspection tool 102 may include a controller 116*a* that is configured to control the operation of the inspection device 112, and the monitoring system 118 may include a controller 116*b* that is configured to control the operation of the monitoring system 118. The controller 116*b* may be configured to provide signals to the controller 116*a* to control the operation of the inspection device 112 based on monitoring the distance D1 between the bottom lens 114 and the top surface of the semiconductor workpiece 104.

As indicated above, FIGS. 1A and 1B are provided as examples. Other examples may differ from what is described with regard to FIGS. 1A and 1B.

Figure 2A:
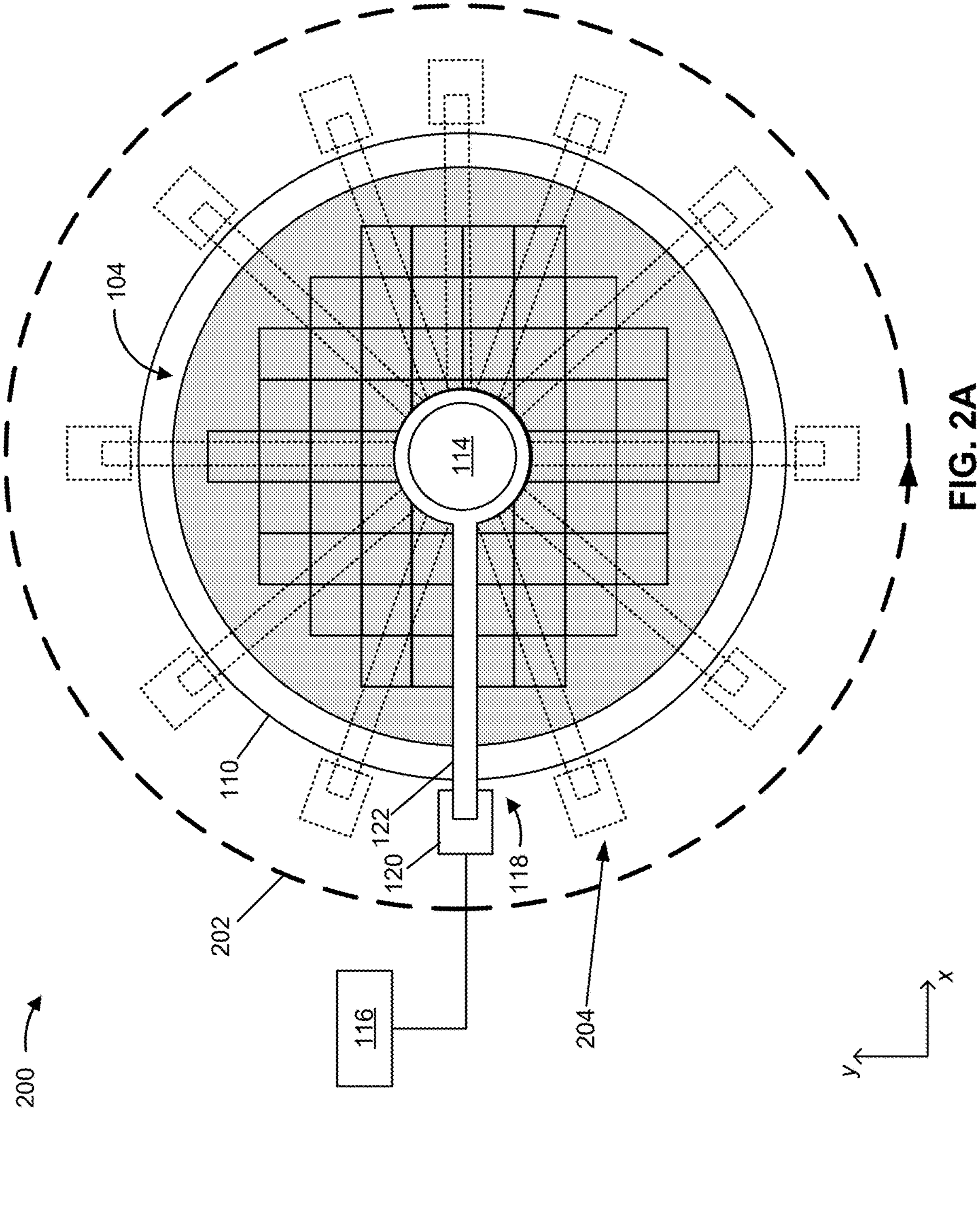
FIGS. 2A and 2B are diagrams of examples of using a monitoring system described herein to monitor a distance between a semiconductor inspection tool and a semiconductor workpiece.
Figure 2B:
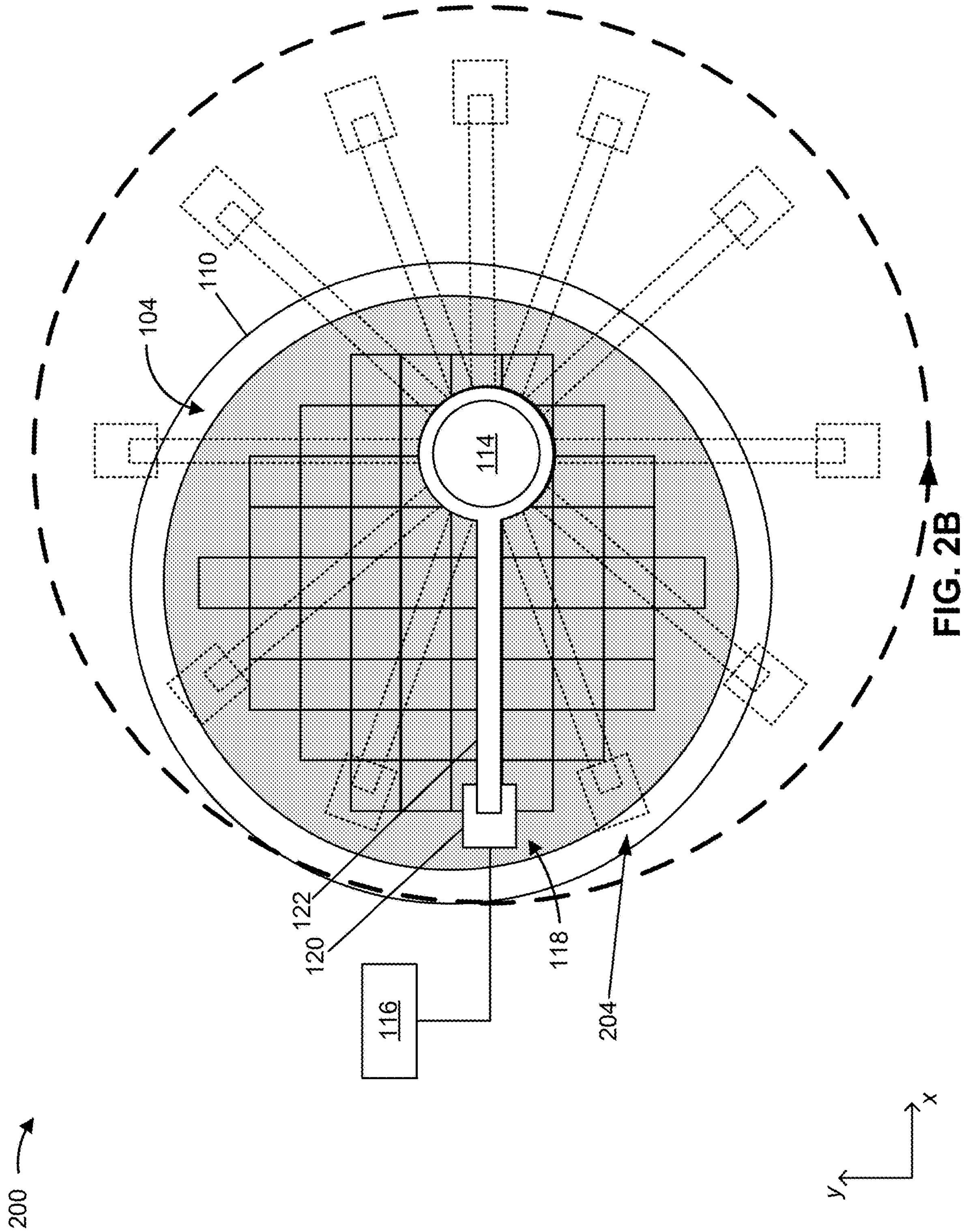

FIGS. 2A and 2B are diagrams of examples 200 of using a monitoring system 118 described herein to monitor a distance D1 between a bottom lens 114 of a semiconductor inspection tool 102 and a semiconductor workpiece 104. FIGS. 2A and 2B illustrate a top view of the monitoring system 118. As shown in FIGS. 2A and 2B, the support member 122 of the monitoring system 118 may rotate the monitoring device 120 around the bottom lens 114 of the semiconductor inspection tool 102. The monitoring device 120 may traverse along a monitoring path around the bottom lens 114, and may generate images and/or video at various points along the monitoring path. In some implementations, the monitoring device 120 generates a video stream as the monitoring device 120 traverses along the monitoring path 202 so that the distance D1 between the bottom lens 114 and the semiconductor workpiece 104 can be continuously monitored. In some implementations, the monitoring device 120 is stopped and maintained at each of a plurality of monitoring positions 204 along the monitoring path 202 so that the monitoring device 120 can generate an image and/or a video at each monitoring position 204.

In some implementations, the monitoring device 120 is continuously moved through each of the monitoring positions 204 along the monitoring path 202 as the semiconductor inspection tool 102 is used to inspect the semiconductor workpiece 104. In some implementations, the monitoring device 120 completes a loop around the monitoring path 202 for each inspection location on the semiconductor workpiece 104. For example, the monitoring device 120 may complete a first loop around the monitoring path 202 (and may generate images and/or video at each monitoring position 204 along the monitoring path 202) for a first inspection location on the semiconductor workpiece 104 in FIG. 2A, the bottom lens 114 may be moved to a second inspection location on the semiconductor workpiece 104 in FIG. 2B, the monitoring device 120 may complete a second loop around the monitoring path 202 (and may generate images and/or video at each monitoring position 204 along the monitoring path 202) for the second inspection location on the semiconductor workpiece 104 in FIG. 2B, and so on.

As indicated above, FIGS. 2A and 2B are provided as examples. Other examples may differ from what is described with regard to FIGS. 2A and 2B.

Figure 3A:
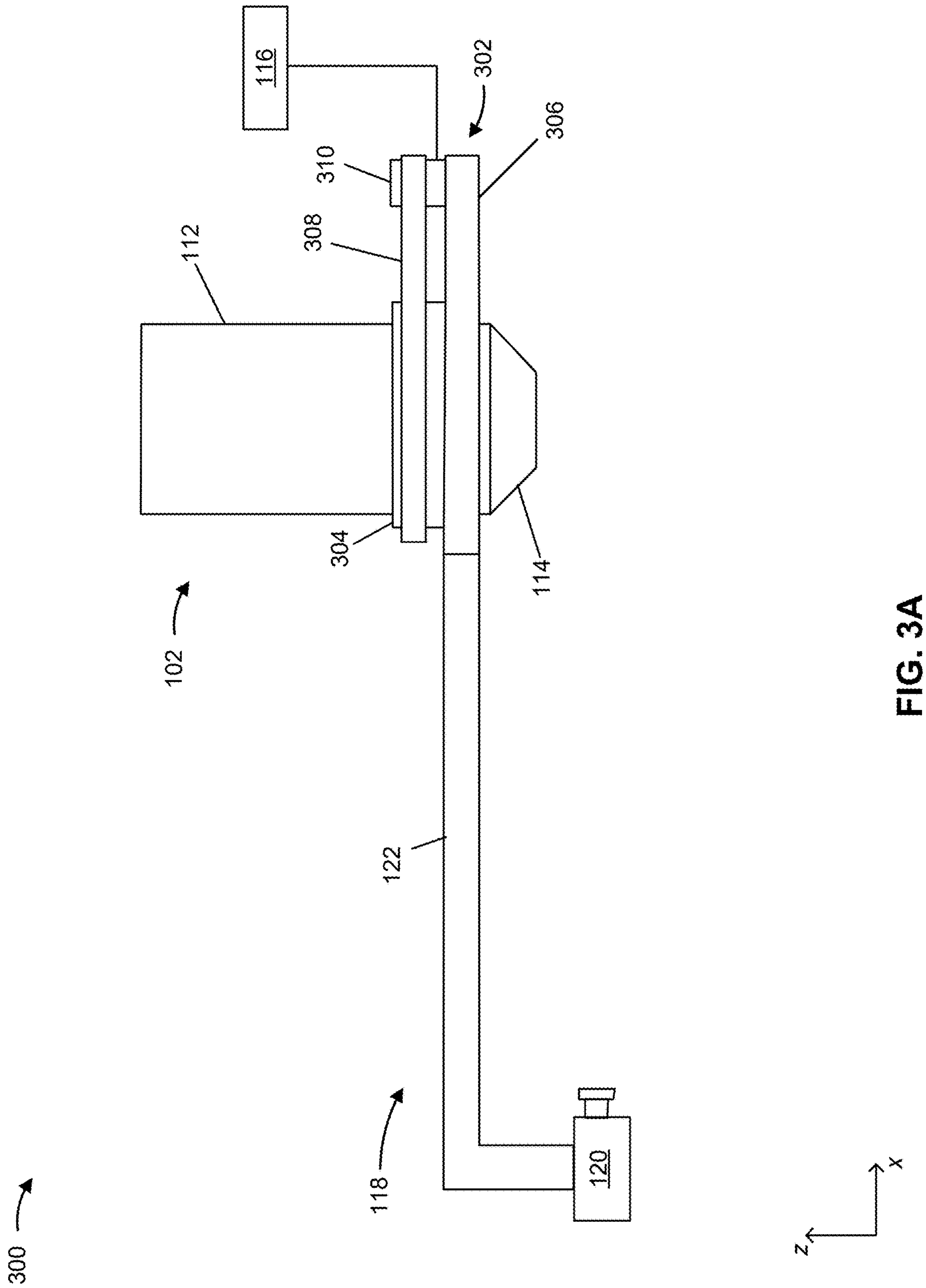
FIGS. 3A and 3B are diagrams of an example implementation of a monitoring system described herein.
Figure 3B:
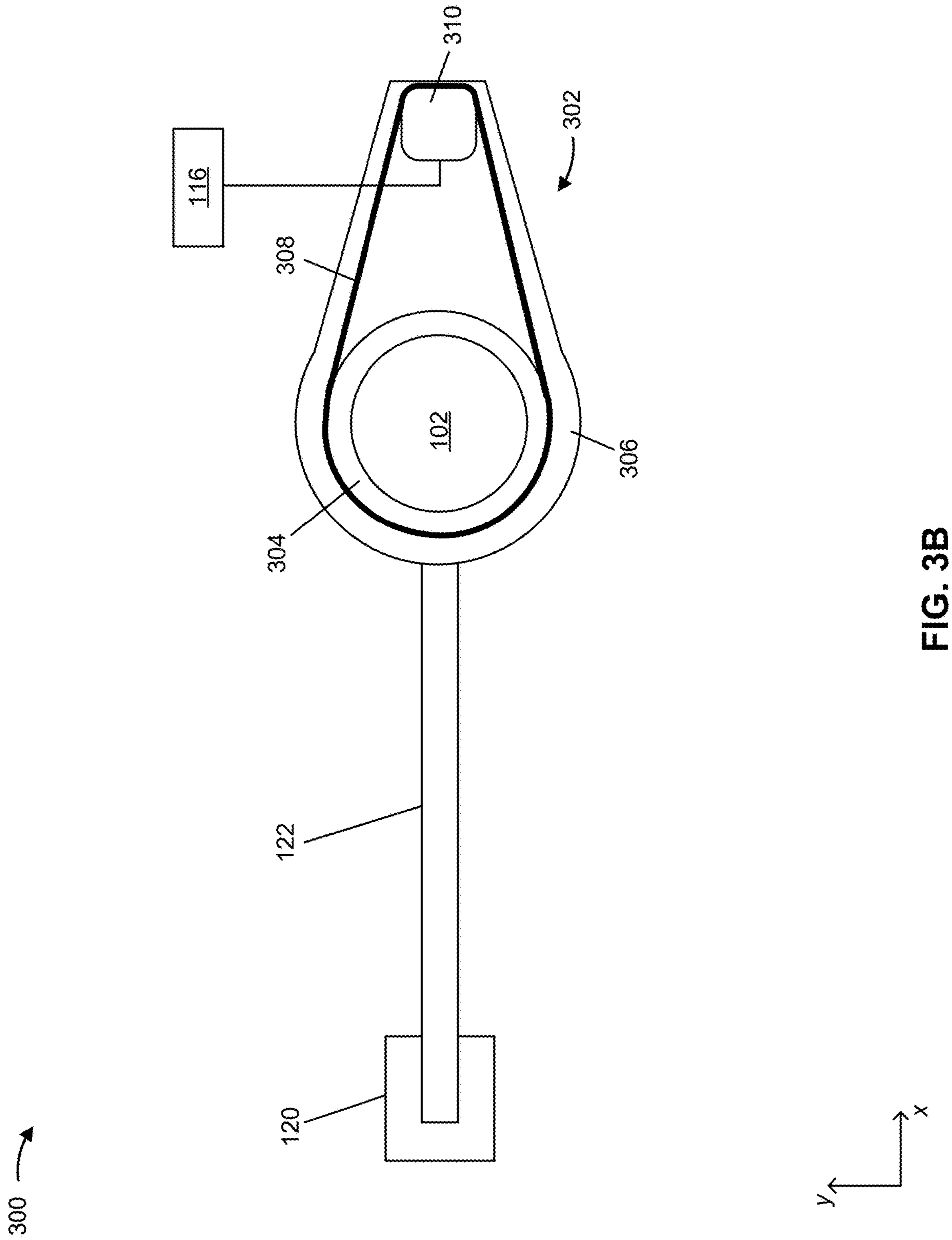

FIGS. 3A and 3B are diagrams of an example implementation 300 of the monitoring system 118 described herein. FIG. 3A illustrates a cross-section view of the example implementation 300 of the monitoring system 118, and FIG. 3B illustrates a top view of the example implementation 300 of the monitoring system 118.

As shown in FIGS. 3A and 3B, in the example implementation 300, the monitoring system 118 may include a belt drive system 302 that is configured to rotate the support member 122 (and the monitoring device 120 coupled to the support member 122) around the bottom lens 114 of the semiconductor inspection tool 102. The belt drive system 302 includes an annular ring 304 coupled to the inspection device 112. The annular ring 304 is configured to be interfaced with the inspection device 112 in that the annular ring 304 is configured to be fitted around the inspection device 112. The belt drive system 302 further includes base plate 306 coupled to the annular ring 304 and coupled to the support member 122. The base plate 306 is fitted around the annular ring 304. The annular ring 304 may be a stator and the base plate 306 may be a rotor in that the base plate 306 is configured to rotate around the annular ring 304, and the annular ring 304 may be fixed in place to the inspection device 112.

The belt drive system 302 further includes a drive belt 308 coupled to the annular ring 304 and to a drive motor 310 that is mounted on the base plate 306. The drive belt 308 wraps around the annular ring 304 and around the drive motor 310 (e.g., as shown in FIG. 3B) such that the drive belt 308 is tensioned between the annular ring 304 and the drive motor 310. The drive motor 310 is configured to rotate, and the rotation of the drive motor 310 (in combination with the tension of the drive belt 308) causes the drive motor 310 to move or roll along the drive belt 308. This causes the base plate 306 (and thus, the support member 122 and the monitoring device 120) to rotate around the annular ring 304 (and thus, around the bottom lens 114).

As indicated above, FIGS. 3A and 3B are provided as an example. Other examples may differ from what is described with regard to FIGS. 3A and 3B.

Figure 4A:
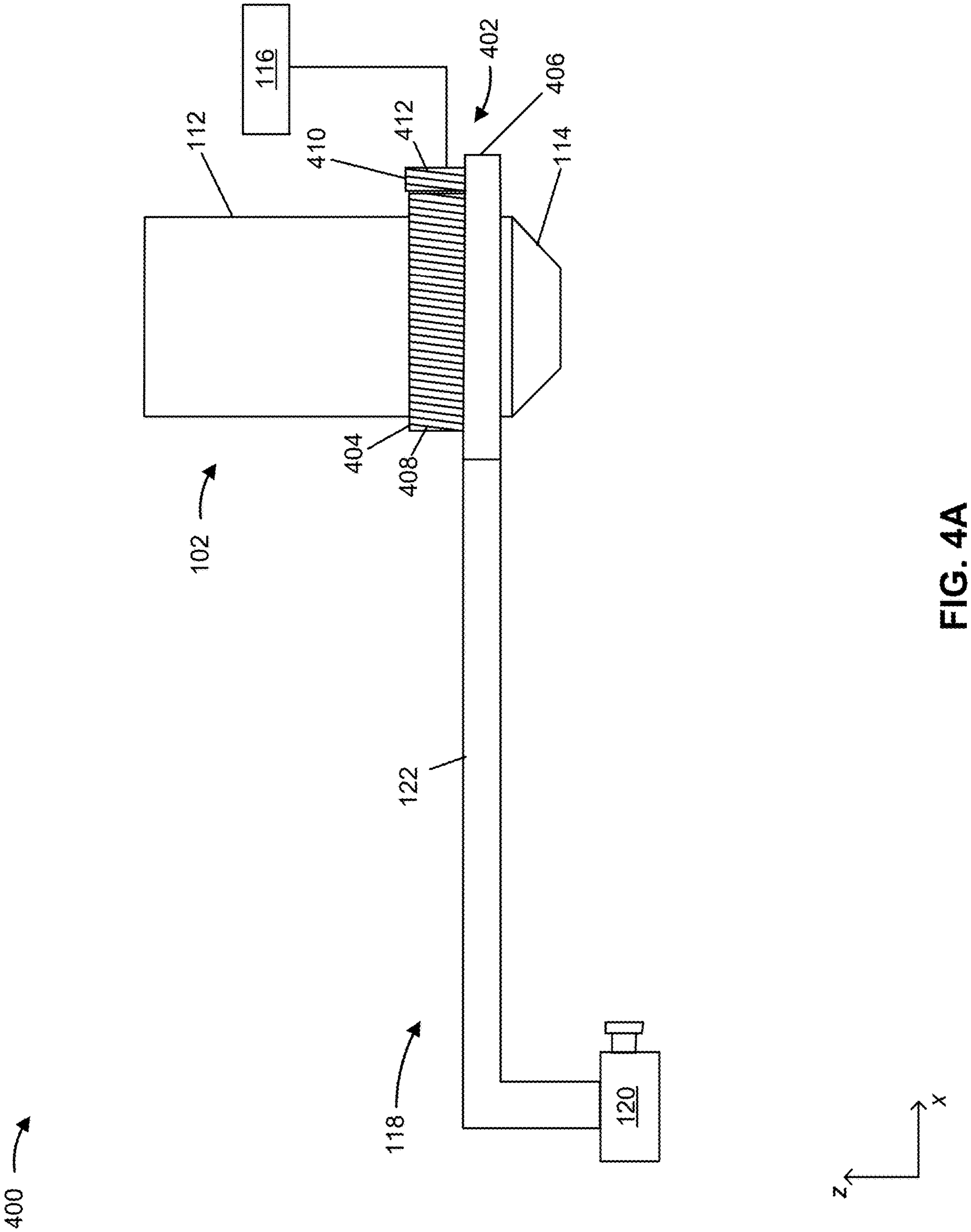
FIGS. 4A and 4B are diagrams of an example implementation of a monitoring system described herein.
Figure 4B:
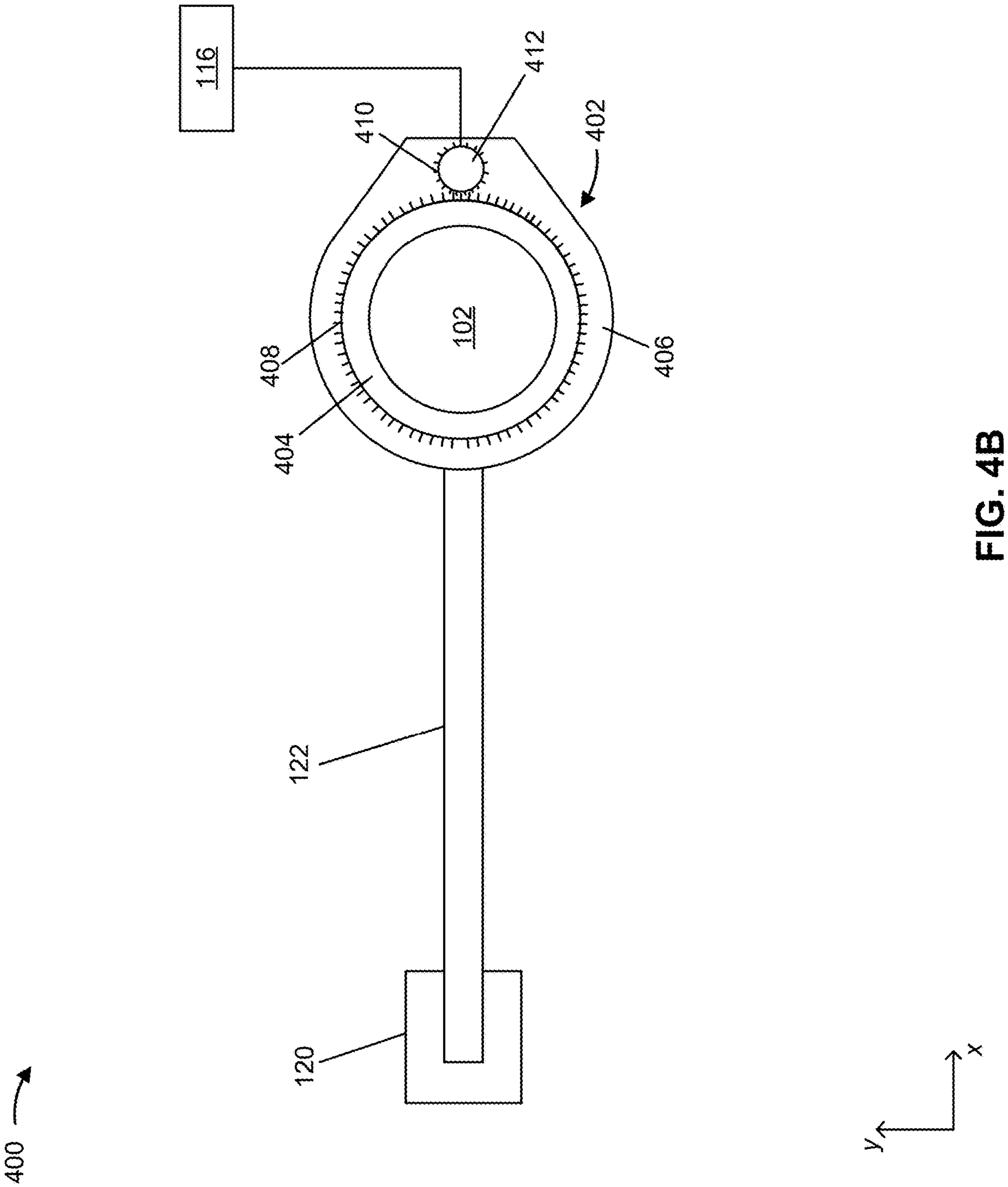

FIGS. 4A and 4B are diagrams of an example implementation 400 of the monitoring system 118 described herein. FIG. 4A illustrates a cross-section view of the example implementation 400 of the monitoring system 118, and FIG. 4B illustrates a top view of the example implementation 400 of the monitoring system 118.

As shown in FIGS. 4A and 4B, in the example implementation 400, the monitoring system 118 may include a gear drive system 402 that is configured to rotate the support member 122 (and the monitoring device 120 coupled to the support member 122) around the bottom lens 114 of the semiconductor inspection tool 102. The gear drive system 402 includes an annular ring 404 coupled to the inspection device 112. The annular ring 404 is configured to be interfaced with the inspection device 112 in that the annular ring 404 is configured to be fitted around the inspection device 112. The gear drive system 402 further includes base plate 406 coupled to the annular ring 404 and coupled to the support member 122. The base plate 406 is fitted around the annular ring 404. The annular ring 404 may be a stator and the base plate 406 may be a rotor in that the base plate 406 is configured to rotate around the annular ring 404, and the annular ring 404 may be fixed in place to the inspection device 112.

As further shown in FIGS. 4A and 4B, the annular ring 404 includes a set of gear teeth 408 around the annular ring 404. The gear teeth 408 are configured to interface with (e.g., mesh with) a set of gear teeth 410 on a drive motor 412 that is mounted to the base plate 406. The drive motor 412 is configured to rotate, and the rotation of the drive motor 412 causes the gear teeth 410 on the drive motor 412 to engage the gear teeth 408 on the annular ring 404. This causes the base plate 406 (and thus, the support member 122 and the monitoring device 120) to rotate around the annular ring 404 (and thus, around the bottom lens 114).

As indicated above, FIGS. 4A and 4B are provided as an example. Other examples may differ from what is described with regard to FIGS. 4A and 4B.

Figure 5:
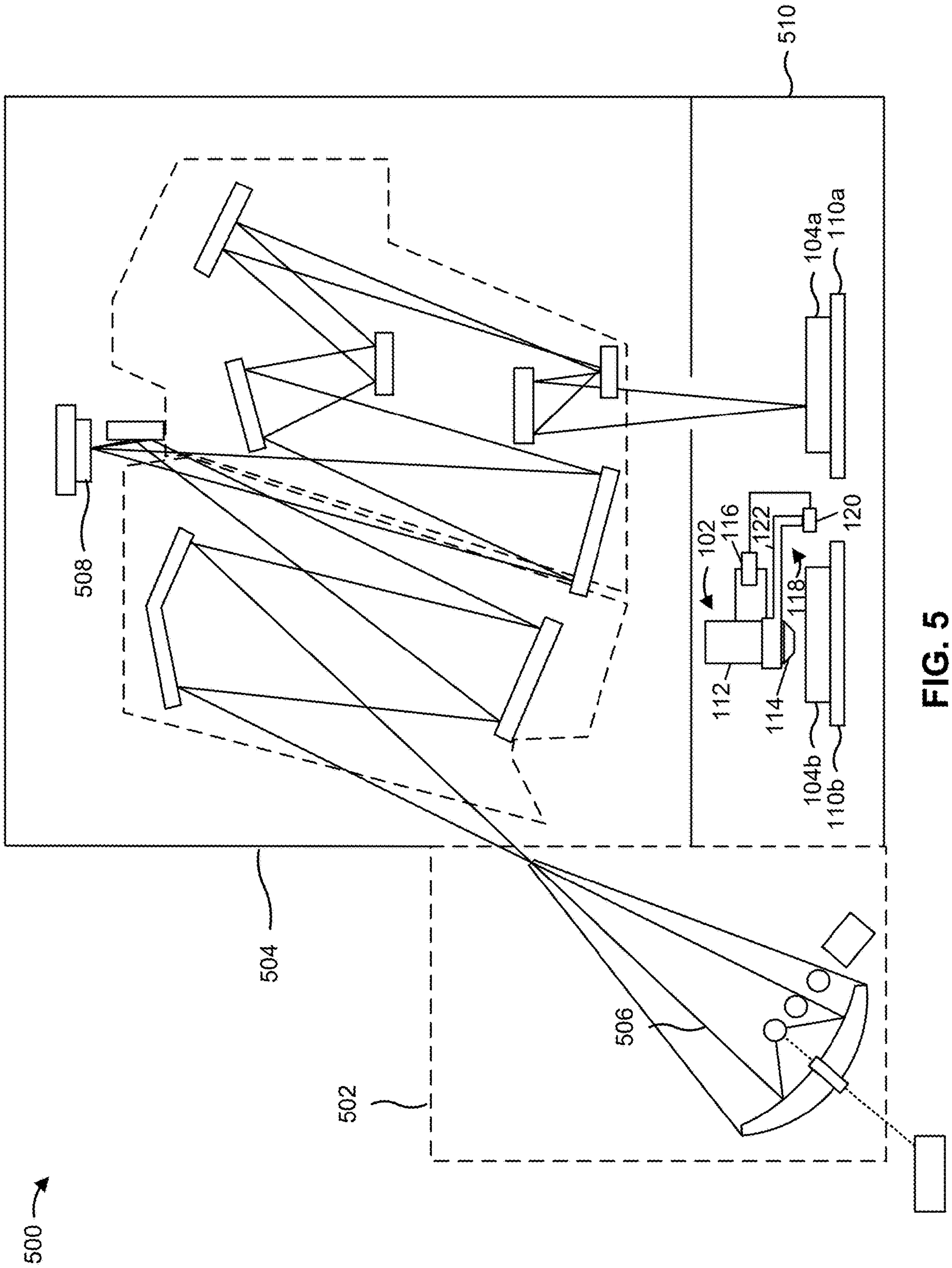
FIG. 5 is a diagram of an example semiconductor processing tool in which a semiconductor inspection tool and a monitoring system described herein may be used.

FIG. 5 is a diagram of an example semiconductor processing tool 500 in which the semiconductor inspection tool 102 and the monitoring system 118 described herein may be used. The semiconductor processing tool 500 may be an extreme ultraviolet (EUV) lithography system or another type of lithography system that is configured to transfer a pattern to a semiconductor substrate using mirror-based optics. However, the semiconductor inspection tool 102 and the monitoring system 118 may be used in other semiconductor processing tools, such as a planarization tool, a deposition tool, a bonding tool, an ion implantation tool, and/or another type of semiconductor processing tool.

As shown in FIG. 5, the semiconductor processing tool 500 includes the radiation source 502 and an exposure tool 504. The semiconductor processing tool 500 may be used to perform a semiconductor processing operation (e.g., an exposure operation) on a semiconductor workpiece 104. The radiation source 502 (e.g., an EUV radiation source or another type of radiation source) may be used to generate radiation 506 such as EUV radiation and/or another type of electromagnetic radiation (e.g., light), and the exposure tool 504 (e.g., an EUV scanner or another type of exposure tool) may be used to focus the radiation 506 onto a reflective reticle 508 (or a photomask) such that a pattern is transferred from the reticle 508 onto the semiconductor workpiece 104 in the semiconductor processing operation.

The semiconductor processing tool 500 may include a bottom module 510. A plurality of stages 110*a* and 110*b* may be included in the bottom module 510. Semiconductor workpieces 104*a* and 104*b* may be respectively placed on the stages 110*a* and 110*b*. The bottom module 510 isolates the stages 110*a* and 110*b* from other areas in the exposure tool 504 to reduce and/or minimize contamination of the semiconductor workpieces 104*a* and 104*b*. Moreover, the bottom module 510 may provide physical isolation for the stage 110$a$ and 110$b$ by reducing the transfer of vibrations (e.g., vibrations in the semiconductor processing environment in which the semiconductor processing tool 500 is located, vibrations in the semiconductor processing tool 500 during operation of the semiconductor processing tool 500) to the stages 110$a$ and 110$b$ and, therefore, the semiconductor workpieces 104$a$ and 104$b$. This reduces movement and/or disturbance of the semiconductor workpieces 104$a$ and 104$b$, which reduces the likelihood that the vibrations may cause a pattern misalignment.

Including a plurality of stages 110$a$ and 110$b$ in the bottom module 510 enable simultaneous inspection (e.g., pre-exposure inspection, post-exposure inspection) and exposure of the semiconductor workpieces 104$a$ and 104$b$, which may increase the throughput of the semiconductor processing tool 500. The semiconductor inspection tool 102 may be included in the bottom module 510 to inspect the semiconductor workpiece 104$b$ (e.g., while the semiconductor workpieces 104$b$ is being exposed to the radiation 506) in preparation for an exposure operation and/or after an exposure operation associated with the semiconductor workpiece 104$b$. The monitoring system 118 may monitor the distance (e.g., distance D1) between the bottom lens 114 of the monitoring system 118 and the surface of the semiconductor workpiece 104$b$ during inspection of the semiconductor workpiece 104$b$, as described in connection with FIGS. 1A, 1B, 2A, and/or 2B, among other examples.

As indicated above, FIG. 5 is provided as an example. Other examples may differ from what is described with regard to FIG. 5.

Figure 6:
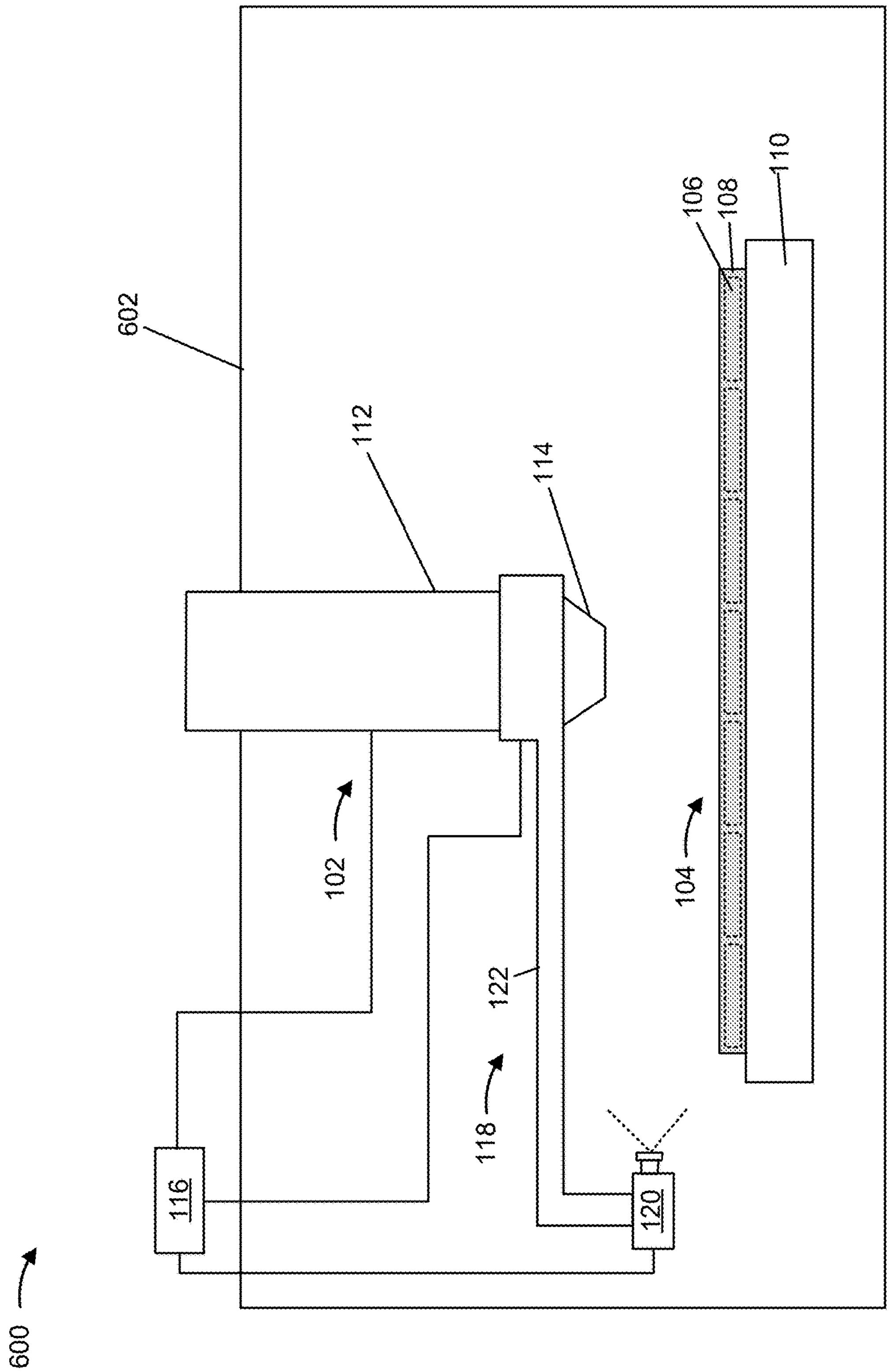
FIG. 6 is a diagram of an example semiconductor inspection system in which a semiconductor inspection tool and a monitoring system described herein may be used.

FIG. 6 is a diagram of an example semiconductor inspection system 600 in which the semiconductor inspection tool 102 and the monitoring system 118 described herein may be used. The semiconductor inspection system 600 may include a standalone semiconductor inspection system, such as an electron microscope tool (e.g., a transmissive electron microscope (TEM) inspection tool, a scanning electron microscope (SEM) inspection tool), a metrology tool (e.g., a measurement tool that is used to measure one or more dimensions of a semiconductor workpiece 104), a defect inspection tool, and/or another type of standalone semiconductor inspection system.

As shown in FIG. 6, the semiconductor inspection system 600 may include an inspection chamber 602 in which the stage 110 and the bottom lens 114 are located. The monitoring device 120 and the support member 122 of the monitoring system 118 may also be included in the inspection chamber 602. A semiconductor workpiece 104 may be received on the stage 110 in the inspection chamber 602 for an inspection operation, and the monitoring system 118 may monitor a distance between the bottom lens 114 at the top surface of the semiconductor workpiece 104 prior to, during, and/or after the inspection operation.

As indicated above, FIG. 6 is provided as an example. Other examples may differ from what is described with regard to FIG. 6.

Figure 7:
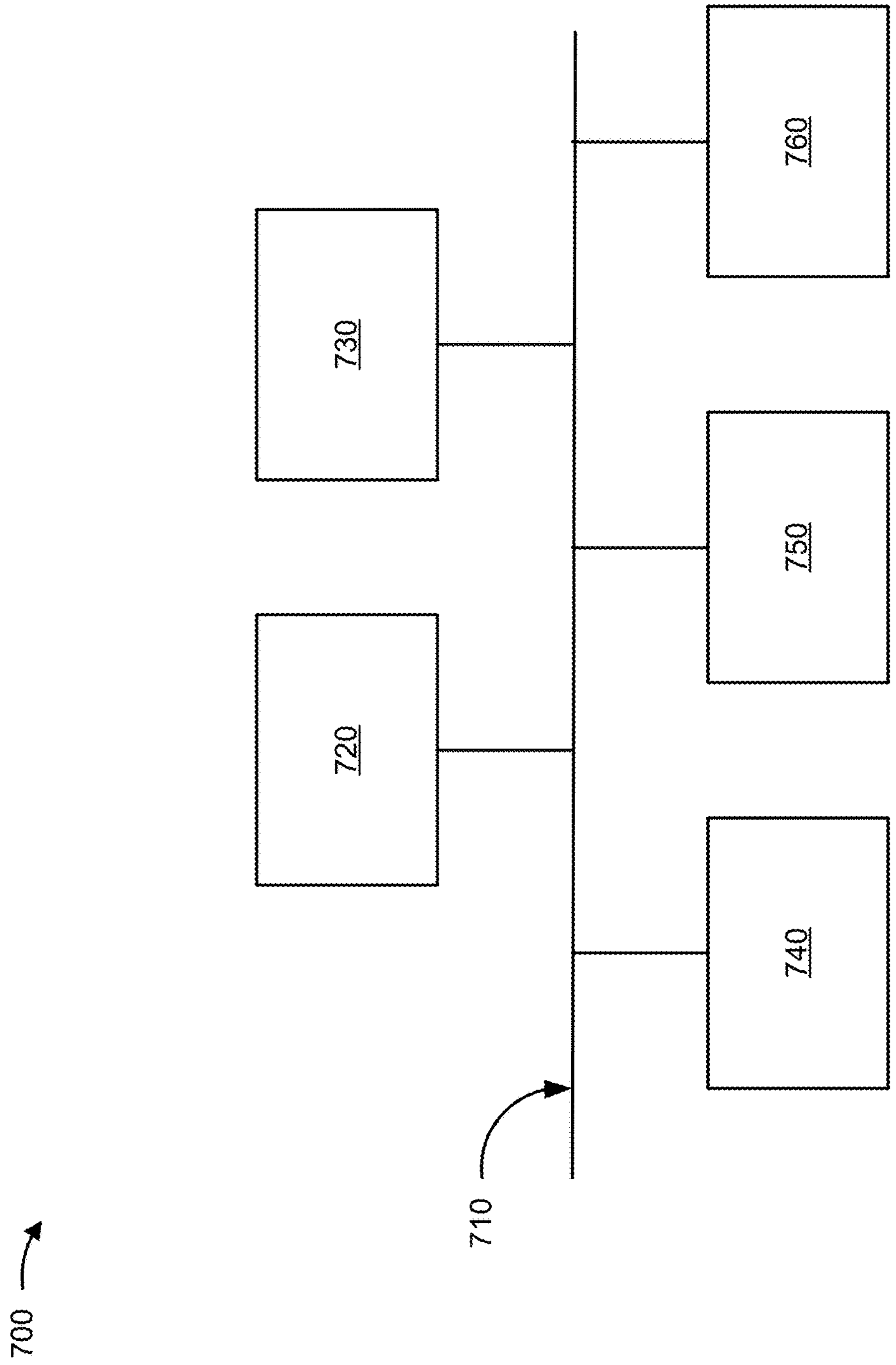
FIG. 7 is a diagram of example components of a device described herein.

FIG. 7 is a diagram of example components of a device 700 described herein. The device 700 may correspond to one or more devices of the semiconductor inspection tool 102 and/or one or more devices of the monitoring system 118, such as the controller 116, the controller 116$a$, and/or the controller 116$b$, among other examples. In some implementations, one or more devices of the semiconductor inspection tool 102 and/or one or more devices of the monitoring system 118, such as the controller 116, the controller 116$a$, and/or the controller 116$b$, among other examples may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit (CPU), a graphics processing unit (GPU), a microprocessor, a controller, a microcontroller, a digital signal processor (DSP), an FPGA, an ASIC, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
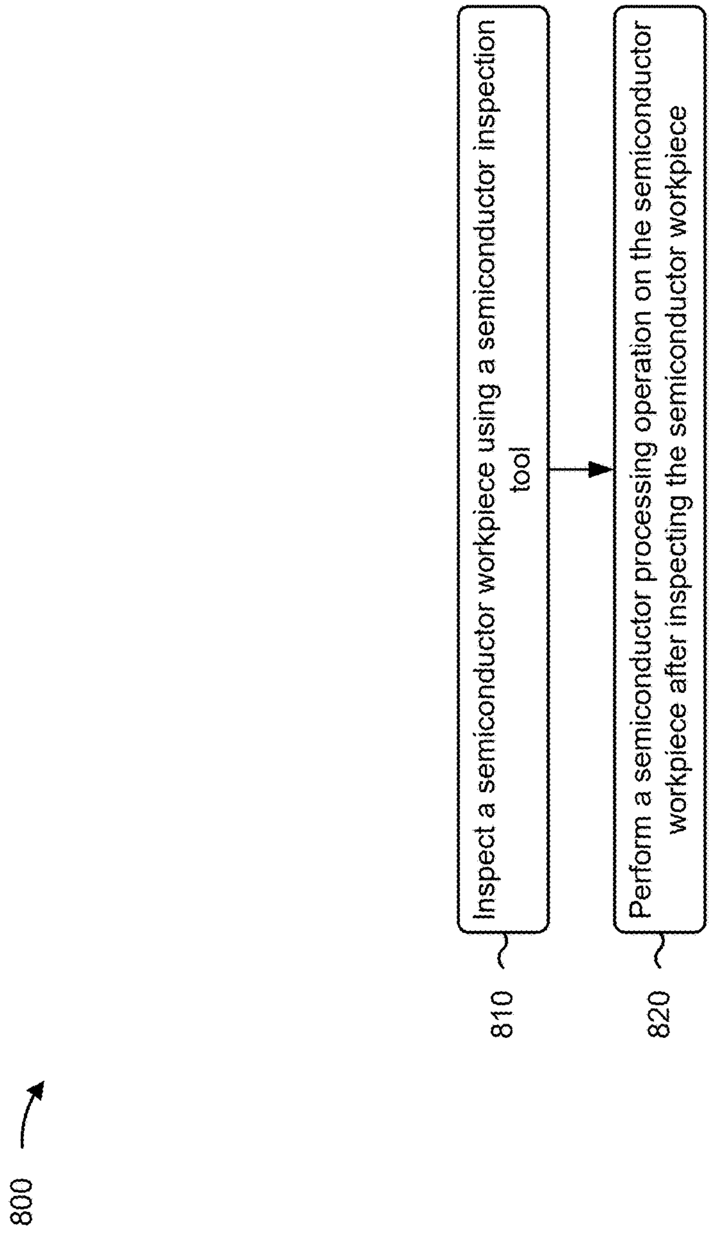
FIG. 8 is a flowchart of an example process associated with performing a semiconductor processing operation associated with a semiconductor workpiece.

FIG. 8 is a flowchart of an example process 800 associated with performing a semiconductor processing operation associated with a semiconductor workpiece. In some implementations, one or more process blocks of FIG. 8 are performed using a semiconductor processing tool, such as the semiconductor processing tool 500, among other examples. In some implementations, one or more process blocks of FIG. 8 are performed using a semiconductor inspection tool, such as the semiconductor inspection tool 102, among other examples. In some implementations, one or more process blocks of FIG. 8 are performed using a distance monitoring system, such as the monitoring system 118, among other examples. In some implementations, one or more process blocks of FIG. 8 are performed using a device 700 that includes a processor 720, a memory 730, an input component 740, an output component 750, and/or a communication component 760, among other examples.

As shown in FIG. 8, process 800 may include inspecting a semiconductor workpiece using a semiconductor inspection tool (block 810). For example, the semiconductor inspection tool 102 may be used to inspect a semiconductor workpiece 104 (e.g., a semiconductor die 106, a semiconductor wafer 108, a lithography mask, a lithography reticle), as described herein. In some implementations, a monitoring system 118, mounted to the semiconductor inspection tool 102, monitors a distance (e.g., a distance D1) between the semiconductor inspection tool 102 and the semiconductor workpiece 104.

As further shown in FIG. 8, process 800 may include performing a semiconductor processing operation on the semiconductor workpiece after inspecting the semiconductor workpiece (block 820). For example, the semiconductor processing tool 500 (or another semiconductor processing tool) may be used to perform a semiconductor processing operation on the semiconductor workpiece 104 after the semiconductor inspection tool 102 is used to inspect the semiconductor workpiece 104, as described herein.

Process 800 may include additional implementations, such as any single implementation or any combination of implementations described below and/or in connection with one or more other processes described elsewhere herein.

In a first implementation, the monitoring system 118 monitors the distance between the semiconductor inspection tool and the semiconductor workpiece 104 while the semiconductor inspection tool is used to inspect the semiconductor workpiece 104.

In a second implementation, alone or in combination with the first implementation, the monitoring system 118 monitors the distance between the semiconductor inspection tool and the semiconductor workpiece 104 while a bottom lens 114 of the semiconductor inspection tool is lowered toward a top surface of the semiconductor workpiece 104.

In a third implementation, alone or in combination with one or more of the first and second implementations, the semiconductor inspection tool stops movement of the bottom lens toward the semiconductor workpiece 104 based on the monitoring system 118 monitoring the distance between the semiconductor inspection tool and the semiconductor workpiece 104.

In a fourth implementation, alone or in combination with one or more of the first through third implementations, the semiconductor inspection tool maintains the distance between the semiconductor inspection tool and the semiconductor workpiece 104 to be approximately equal to or greater than a threshold distance (e.g., a distance threshold 124) based on the monitoring system 118 monitoring the distance between the semiconductor inspection tool and the semiconductor workpiece 104.

In a fifth implementation, alone or in combination with one or more of the first through fourth implementations, performing the semiconductor processing operation includes performing an exposure operation. Alternatively, performing the semiconductor processing operation may include performing a planarization operation, performing an etch operation, performing an ion implantation operation, performing a bonding operation, and/or performing another type of semiconductor processing operation.

In a sixth implementation, alone or in combination with one or more of the first through fifth implementations, the semiconductor inspection tool and the monitoring system are included in a bottom module 510 of an exposure tool 504.

In a seventh implementation, alone or in combination with one or more of the first through sixth implementations, process 800 includes using the semiconductor inspection tool 102 to inspect the semiconductor workpiece 104 after the semiconductor processing operation is performed on the semiconductor workpiece 104, during which the monitoring system 118 monitors the distance between the semiconductor inspection tool 102 and the semiconductor workpiece 104.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

Figure 9:
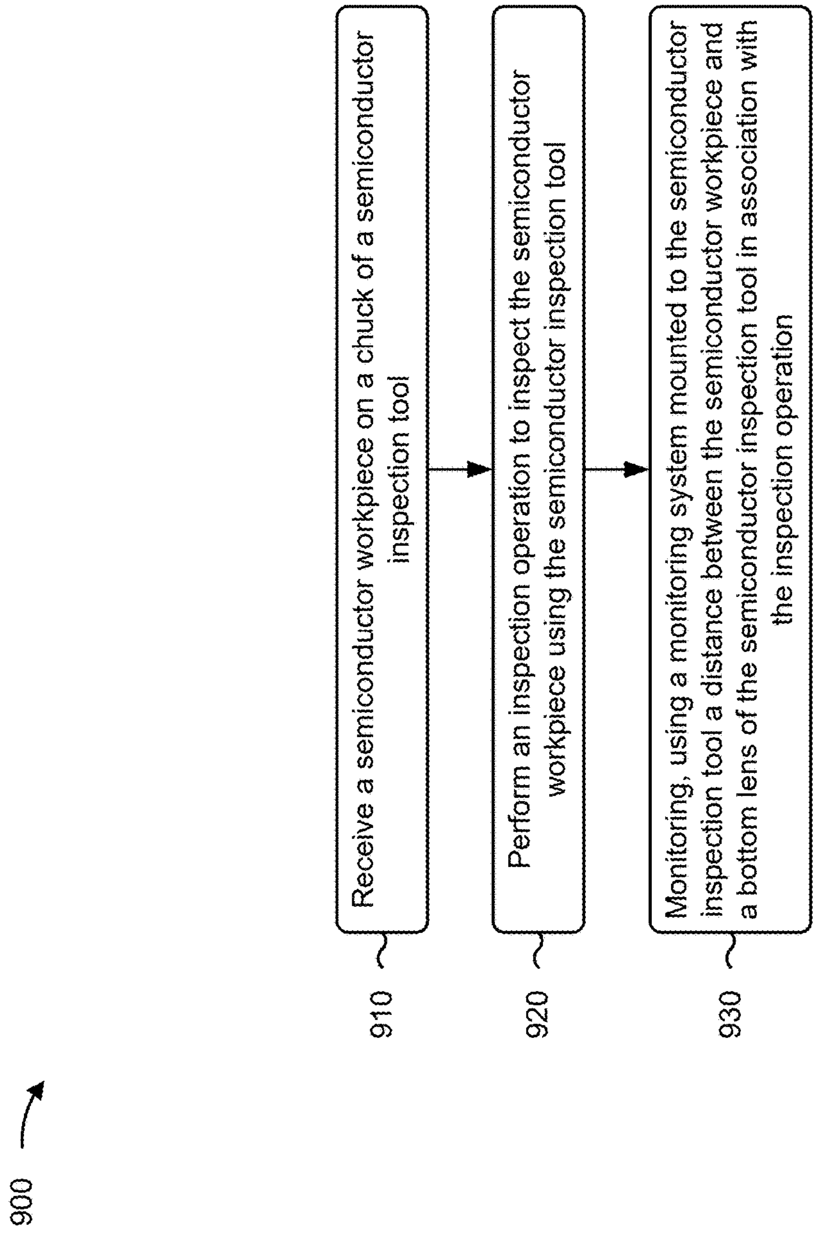
FIG. 9 is a flowchart of an example process associated with inspecting a semiconductor workpiece.

FIG. 9 is a flowchart of an example process 900 associated with inspecting a semiconductor workpiece. In some implementations, one or more process blocks of FIG. 9 are performed using a semiconductor inspection tool, such as the semiconductor inspection tool 102, among other examples. In some implementations, one or more process blocks of FIG. 9 are performed using a distance monitoring system, such as the monitoring system 118, among other examples. In some implementations, one or more process blocks of FIG. 9 are performed using a device 700 that includes a processor 720, a memory 730, an input component 740, an output component 750, and/or a communication component 760, among other examples.

As shown in FIG. 9, process 900 may include receiving a semiconductor workpiece on a stage of a semiconductor inspection tool (block 910). For example, the semiconductor inspection tool 102 may be used to receive a semiconductor workpiece 104 (e.g., a semiconductor die 106, a semiconductor wafer 108, a lithography mask, a lithography reticle) on a stage 110 of the semiconductor inspection tool 102, as described herein.

As further shown in FIG. 9, process 900 may include performing an inspection operation to inspect the semiconductor workpiece using the semiconductor inspection tool (block 920). For example, the semiconductor inspection tool 102 may be used to perform an inspection operation to inspect the semiconductor workpiece 104 using the semiconductor inspection tool 102, as described herein.

As further shown in FIG. 9, process 900 may include monitoring, using a monitoring system mounted to the semiconductor inspection tool a distance between the semiconductor workpiece 104 and a bottom lens of the semiconductor inspection tool in association with the inspection operation (block 930). For example, the monitoring system 118 may be used to monitor a distance (e.g., a distance D1) between the semiconductor workpiece 104 and a bottom lens 114 of the semiconductor inspection tool 102 in association with the inspection operation, as described herein.

Process 900 may include additional implementations, such as any single implementation or any combination of implementations described below and/or in connection with one or more other processes described elsewhere herein.

In a first implementation, monitoring the distance between the semiconductor workpiece 104 and the bottom lens 114 includes rotating a monitoring device 120, of the monitoring system 118, around the bottom lens 114 to monitor the distance between the semiconductor workpiece 104 and the bottom lens 114.

In a second implementation, alone or in combination with the first implementation, rotating the monitoring device 120 around the bottom lens 114 includes rotating the monitoring device 120 around the bottom lens 114 using a support member 122, the support member 122 being mounted to the semiconductor inspection tool 102 at a first end of the support member and the monitoring device 120 being mounted to the support member 122 at a second end of the support member 122 opposing the first end.

In a third implementation, alone or in combination with one or more of the first and second implementations, rotating the monitoring device 120 around the bottom lens 114 includes using a drive system (e.g., a belt drive system 302, a gear drive system 402) coupled with the support member 122 to rotate the monitoring device 120 around the bottom lens 114.

In a fourth implementation, alone or in combination with one or more of the first through third implementations, monitoring the distance between the semiconductor workpiece 104 and the bottom lens 114 includes generating, using a monitoring device 120 of the monitoring system 118, one or more images at each of a plurality of monitoring positions 204 as the monitoring device 120 is moved along a monitoring path 202 around the bottom lens 114.

In a fifth implementation, alone or in combination with one or more of the first through fourth implementations, process 900 includes determining, using a controller 116 of the semiconductor inspection tool 102, whether the distance between the semiconductor workpiece 104 and the bottom lens 114 satisfies a minimum distance threshold (e.g., a distance threshold 124).

In a sixth implementation, alone or in combination with one or more of the first through fifth implementations, process 900 includes determining, using a controller 116 of the semiconductor inspection tool 102, that the distance between the semiconductor workpiece 104 and the bottom lens 114 does not satisfy a minimum distance threshold (e.g., a distance threshold 124), and causing, using the controller 116, the distance between the semiconductor workpiece 104 and the bottom lens 114 to be increased based on determining that the distance between the semiconductor workpiece 104 and the bottom lens 114 does not satisfy the minimum distance threshold.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

In this way, a semiconductor inspection tool may include a distance monitoring system that is configured to monitor the distance between a microscope of the semiconductor inspection tool and a semiconductor workpiece under inspection. The distance monitoring system may include a support member and a monitoring device mounted to an end of the support member. An opposing end of the support member may be coupled to the microscope, and an actuator may be used to spin the monitoring device around the microscope using the support member. The monitoring device is configured to spin around the microscope and generate images and/or a video that can be used to monitor the distance between the microscope and the surface of the semiconductor workpiece to ensure that a minimum distance between the microscope and the semiconductor workpiece is maintained.

As described in greater detail above, some implementations described herein provide a method. The method includes inspecting a semiconductor workpiece using a semiconductor inspection tool, where a monitoring system, mounted to the semiconductor inspection tool, monitors a distance between the semiconductor inspection tool and the semiconductor workpiece. The method includes performing a semiconductor processing operation on the semiconductor workpiece after inspecting the semiconductor workpiece.

As described in greater detail above, some implementations described herein provide a method. The method includes receiving a semiconductor workpiece on a stage of a semiconductor inspection tool. The method includes performing an inspection operation to inspect the semiconductor workpiece using the semiconductor inspection tool. The method includes monitoring, using a monitoring system mounted to the semiconductor inspection tool a distance between the semiconductor workpiece and a bottom lens of the semiconductor inspection tool in association with the inspection operation.

As described in greater detail above, some implementations described herein provide a semiconductor inspection tool. The semiconductor inspection tool includes an inspection device comprising a bottom lens. The semiconductor inspection tool includes a lens monitoring system that includes a support member coupled with the inspection device and a monitoring device coupled with the support member.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

The terms “approximately” and “substantially” can indicate a value of a given quantity that varies within 5% of the value (e.g., ±1%, ±2%, ±3%, ±4%, ±5% of the value). These values are merely examples and are not intended to be limiting. It is to be understood that the terms “approximately” and “substantially” can refer to a percentage of the values of a given quantity in light of this disclosure.

When “a processor” or “one or more processors” (or another device or component, such as “a controller” or “one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

inspecting a semiconductor workpiece using a semiconductor inspection tool, wherein a monitoring system, mounted to the semiconductor inspection tool, monitors a distance between the semiconductor inspection tool and the semiconductor workpiece, wherein the monitoring system monitors the distance between the semiconductor inspection tool and the semiconductor workpiece by rotating a monitoring device of the monitoring system around the semiconductor inspection tool, and wherein the monitoring device is mounted to the semiconductor inspection tool via a support member that is configured to rotate around the semiconductor inspection tool; and performing a semiconductor processing operation on the semiconductor workpiece after inspecting the semiconductor workpiece.

2. The method of claim 1, wherein the monitoring system monitors the distance between the semiconductor inspection tool and the semiconductor workpiece while the semiconductor inspection tool is used to inspect the semiconductor workpiece.

3. The method of claim 1, wherein the monitoring system monitors the distance between the semiconductor inspection tool and the semiconductor workpiece while a bottom lens, of the semiconductor inspection tool, is lowered toward a top surface of the semiconductor workpiece.

4. The method of claim 3, wherein the semiconductor inspection tool stops movement of the bottom lens toward the semiconductor workpiece based on the monitoring system monitoring the distance between the semiconductor inspection tool and the semiconductor workpiece.

5. The method of claim 1, wherein the semiconductor inspection tool maintains the distance between the semiconductor inspection tool and the semiconductor workpiece to be approximately equal to or greater than a threshold distance based on the monitoring system monitoring the distance between the semiconductor inspection tool and the semiconductor workpiece.

6. The method of claim 1, wherein performing the semiconductor processing operation comprises performing an exposure operation.

7. The method of claim 1, wherein the semiconductor inspection tool and the monitoring system are included in a bottom module of an exposure tool.

8. A method, comprising:

receiving a semiconductor workpiece on a stage of a semiconductor inspection tool;

performing an inspection operation to inspect the semiconductor workpiece using the semiconductor inspection tool; and monitoring, using a monitoring system mounted to the semiconductor inspection tool a distance between the semiconductor workpiece and a bottom lens of the semiconductor inspection tool in association with the inspection operation, wherein monitoring the distance between the semiconductor workpiece and the bottom lens comprises:

rotating a monitoring device of the monitoring system around the bottom lens to monitor the distance between the semiconductor workpiece and the bottom lens.

9. The method of claim 8, wherein rotating the monitoring device around the bottom lens comprises:

rotating the monitoring device around the bottom lens using a support member, wherein the support member is mounted to the semiconductor inspection tool at a first end of the support member, and wherein the monitoring device is mounted to the support member at a second end of the support member opposing the first end.

10. The method of claim 9, wherein rotating the monitoring device around the bottom lens comprises:

using a drive system coupled with the support member to rotate the monitoring device around the bottom lens.

11. The method of claim 8, wherein monitoring the distance between the semiconductor workpiece and the bottom lens comprises:

generating, using the monitoring device of the monitoring system, one or more images at each of a plurality of monitoring positions as the monitoring device is moved along a monitoring path around the bottom lens.

12. The method of claim 8, further comprising:

determining, using a controller of the semiconductor inspection tool, whether the distance between the semiconductor workpiece and the bottom lens satisfies a minimum distance threshold.

13. The method of claim 8, further comprising:

determining, using a controller of the semiconductor inspection tool, that the distance between the semiconductor workpiece and the bottom lens does not satisfy a minimum distance threshold; and causing, using the controller, the distance between the semiconductor workpiece and the bottom lens to be increased based on determining that the distance between the semiconductor workpiece and the bottom lens does not satisfy the minimum distance threshold.

14. A semiconductor inspection tool, comprising:
an inspection device comprising a bottom lens; and
a lens monitoring system comprising:
a support member coupled with the inspection device;
a monitoring device coupled with the support member;
an annular ring around the inspection device; and
a base plate around the annular ring,
wherein the support member is attached to the base plate,
wherein the annular ring is fixed to the inspection device, and
wherein the base plate is configured to rotate relative to the annular ring.

15. The semiconductor inspection tool of claim 14, wherein the lens monitoring system further comprises:
a drive belt coupled with the annular ring; and
a drive motor mounted to the base plate,
wherein the drive belt is coupled with the drive motor.

16. The semiconductor inspection tool of claim 14, wherein the annular ring comprises a first set of gear teeth around the annular ring; and
wherein the lens monitoring system further comprises:
a drive motor, mounted to the base plate, comprising a second set of gear teeth configured to mesh with the first set of gear teeth.

17. The semiconductor inspection tool of claim 14, wherein the lens monitoring system further comprises:
a controller configured to control rotation of the support member around the inspection device.

18. The method of claim 1, further comprising controlling, with a controller, rotation of the support member around the semiconductor inspection tool.

19. The method of claim 1, wherein the monitoring system monitors the distance between a lens of the semiconductor inspection tool and the semiconductor workpiece.

20. The method of claim 1, wherein the support member is attached to a base plate that is configured to rotate relative to an annular ring that is fixed to the semiconductor inspection tool.

* * * * *